United States Patent [19]

Kinnanen

[11] Patent Number: 5,547,234

[45] Date of Patent: Aug. 20, 1996

[54] LOCKING DEVICE FOR LOCKING THE OPENABLE TOP OF AN OPEN AUTOMOBILE

[75] Inventor: Matti Kinnanen, Uusikaupunki, Finland

[73] Assignee: Valmet Automotive, Uusikaupunki, Finland

[21] Appl. No.: 954,000

[22] Filed: Sep. 29, 1992

[30] Foreign Application Priority Data

Oct. 17, 1991 [FI] Finland .................................. 914899

[51] Int. Cl.$^6$ .................................................. E05C 19/10
[52] U.S. Cl. ...................... 292/25; 292/112; 292/DIG. 5
[58] Field of Search ........................... 292/DIG. 5, 25, 292/11, 51, 39, 112, 121

[56] References Cited

U.S. PATENT DOCUMENTS

| 1,715,940 | 6/1929 | Mobbs | 292/DIG. 5 X |
| 2,305,715 | 12/1942 | Keller | 292/DIG. 5 X |
| 2,886,364 | 5/1959 | Smith | 292/DIG. 5 X |
| 2,916,327 | 12/1959 | Gilson | 292/DIG. 5 X |
| 3,089,719 | 5/1963 | Csizmansky | 292/25 |
| 4,830,425 | 5/1989 | Muscat . | |

FOREIGN PATENT DOCUMENTS

| 169673 | 12/1951 | Austria | 292/25 |
| 408951 | 1/1991 | European Pat. Off. . | |
| 430425 | 6/1991 | European Pat. Off. . | |
| 1066881 | 10/1956 | Germany . | |

Primary Examiner—Rodney M. Lindsey
Attorney, Agent, or Firm—Merchant, Gould, Smith, Edell, Welter & Schmidt

[57] ABSTRACT

A locking device for locking in closed position the openable top (1) of an open automobile, comprising connected to a frame rib (3) of the top framework (2) of the openable top: a twisting handle (4), locking hooks (5), and a transmission (6) by which said locking hooks are connected with each other and with one joint twisting handle (4) for transmitting the motion of said twisting handle to said locking hooks in order to bring them simultaneously into opening position, respectively into locking position, and a fixing lug (8) connected to the body (7) of the open automobile and disposed for engagement with a locking hook. The transmission (6) comprises an angle drive (10) placed on the foremost frame rib (3) of the top framework of the openable top, which is operated in a plane substantially parallelling the top, i.e., in a horizontal plane when the top is in closed position, by means of a turnable twisting handle (4), and a spindle (9) transversal to the center-line of the vehicle, which is driven by said angle drive; and the device comprises two self-retaining locking hooks (5) spaced from each other and which are operated by means of said twisting handle over said angle drive and said spindle.

5 Claims, 1 Drawing Sheet 5,547,234

LOCKING DEVICE FOR LOCKING THE OPENABLE TOP OF AN OPEN AUTOMOBILE

BACKGROUND OF THE INVENTION

1. Field of the Invention

The present invention concerns a locking device.

2. Description of the Related Art

The openable top of an open automobile usually consists of a folding top framework mechanism and a resilient covering thereupon, the so-called top fabric. In its opened position the top is folded up in the space behind the seats, or at another suitable location. When closed, the top is stretched out, covering in the manner of a solid top the passenger space of the car or part thereof. In that instance the top has to be locked with a locking device relative to the body.

In prior art are known, through references U.S. Pat. No. 4,830,425 and DE 1,066,881, locking devices operated by one twisting handle, disposed on a frame rib of the car top. The locking device comprises the following elements, connected to the top framework of the openable car top: a twisting handle, locking elements, locking pins, locking hooks or equivalent, and a transmission interconnecting said locking elements and connecting them with one joint twisting handle for transmitting the turning motion of said handle to the locking elements in order to bring them simultaneously into their open position, respectively their locked position, and a fixing lug connected to the body of the open automobile, arranged to engage the locking element. The transmission comprises draw/pushbars arranged to be movable by means of the twisting handle in a direction which is transverse to the car's longitudinal direction. To the ends of said draw/pushbars are connected slide-type locking elements which in their locked position are secured to the fixing lugs.

The problem embarrassing any design of prior art is that in pushbar operation the turning angle of the locking slides, or hooks, always falls short of 180°, and with this no substantial self-retaining feature of the spindle can be achieved.

Another problem associated with locking devices of prior art is that in push/drawbar designs the torque which has to be applied when turning the handle changes throughout the turning motion, and this is not pleasant from the user's point of view.

Pushbar operation is applicable in those instances in which a slide-type locking is used, such as is disclosed in the references cited above, but a design like this poses the further problem that it is difficult therewith to achieve a long pulling motion longitudinally to the car by which a dual advantage would be gained. When closing the canopy top, it would enable adequate tensioning of the top fabric to be achieved with ease. On the other hand the end position of the running-up motion would not have to be as exact as it is required to be in slide-type locking.

SUMMARY OF THE INVENTION

The object of the invention is to eliminate the drawbacks mentioned.

It is a specific object of the invention to disclose a locking device by which one can easily achieve a self-retaining characteristic in the locking device.

It is a further object of the invention to disclose a locking device in which the torque is substantially constant when the twisting handle is being operated.

Moreover, it is an object of the invention to disclose a locking device by which is achieved a long pulling distance from which the locking hook gets the top when it is being closed.

Still another object of the invention is to disclose a locking device which is simple to use and which is structurally simple, yet affords positive, openable locking of the car top.

The locking device of the invention is characterized by that which is stated in claim 1.

As taught by the invention, the transmission comprises an angle drive mounted on the foremost frame rib of the top's framework, this angle drive being operated with a handle turning in a plane substantially parallelling the top, i.e., in a horizontal plane when the top is in closed position, and a spindle transversal to the centre-line of the vehicle, driven by said angle drive; and the device comprises two mutually spaced self-retaining locking hooks which are operated by the twisting handle over the angle drive and the spindle.

The twisting handle and the angle drive may be placed at any point on the foremost frame rib. This point may lie on the centre-line of the vehicle or offset from the centre-line on the driver or passenger side.

The advantage afforded by the invention is that by means of the angle drive and the spindle the angular travel of the locking hooks becomes more than one half-turn, i.e., more than 180°, whereby it is an easy thing to achieve self-retaining of the locking device. In order that one might achieve maximum top-pulling distance as well as self-retaining, discussed above, the angular travel should be more than 180°, advantageously about 200°.

It is a further advantage of the invention that when the twisting handle is turned the torque is substantially constant all the time; this has its significance in view of convenient and pleasant operation of the locking device.

It is a further advantage of the invention that a long pulling distance is achieved with the locking device from which the locking hook will fetch the top when the top is being closed. As a result of the comparatively long pulling motion of the locking hooks in the direction of the car's longitudinal axis, the fabric constituting the top is easy to pull taut when closing the top. Moreover, the end position in running the top up need not be as exact as the locking devices of prior art imply.

It is still another advantage of the invention that the locking device is simple to operate and structurally simple, yet affording positive, openable locking of the top.

In an embodiment of the locking device, the elongated spindle is carried on a rib of the top framework to be rotatable about its longitudinal axis; and the transmission comprises for each locking hook one crank lever, mounted perpendicularly on the spindle, and the locking hook being turnably attached to the crank lever by means of a pivot.

In an embodiment of the locking device, the locking is self-retaining so that when the locking hook is in engagement with the fixing lug and as the crank lever turns, the centre of the pivot passes over the upper dead centre defined by the line connecting the junction point between fixing lug and hook and the centre of the spindle. To this end, the shaft of the hook has been shaped to be curved so that it reaches past the upper dead centre. Between the top rib and the body is interposed an elastic member, suitably a resilient packing, which produces the requisite spring action which with a suitable spring force acts against the turning of the crank lever past the upper dead centre. In this way an efficient self-locking feature of the locking is simply achieved.

The transmission ratio of the angle drive can be selected as desired. The transmission ratio from the shaft of the twisting handle, or the driving shaft, to the spindle, or the driven shaft, may be arbitrary: 1:1 or higher, such as in the range from 1:1 to 1:2. As may be required, the ratio may also be selected to be higher than 1:2. Appropriate selection of the transmission ratio may be employed to determine a suitable turning angle for the twisting handle such as will optimally go together with the structures regarding available space and ease of operation. The higher the transmission ratio the smaller is the hand movement, i.e., the turning angle of the twisting handle by which the angular travel of the spindle greater than 180° is obtained which is required for self-retaining of the locking hooks. If the ratio is 1:3, for instance, turning the handle through 70° will produce 210° angular travel of the spindle. Appropriate selection of the transmission ratio may also be used for determining a magnitude of torque on the twisting handle which is optimal in view of practical operation.

In the following the invention is described in detail, reference being made to the attached drawing, wherein:

DETAILED DESCRIPTION OF THE PREFERRED EMBODIMENTS

Figure 1:
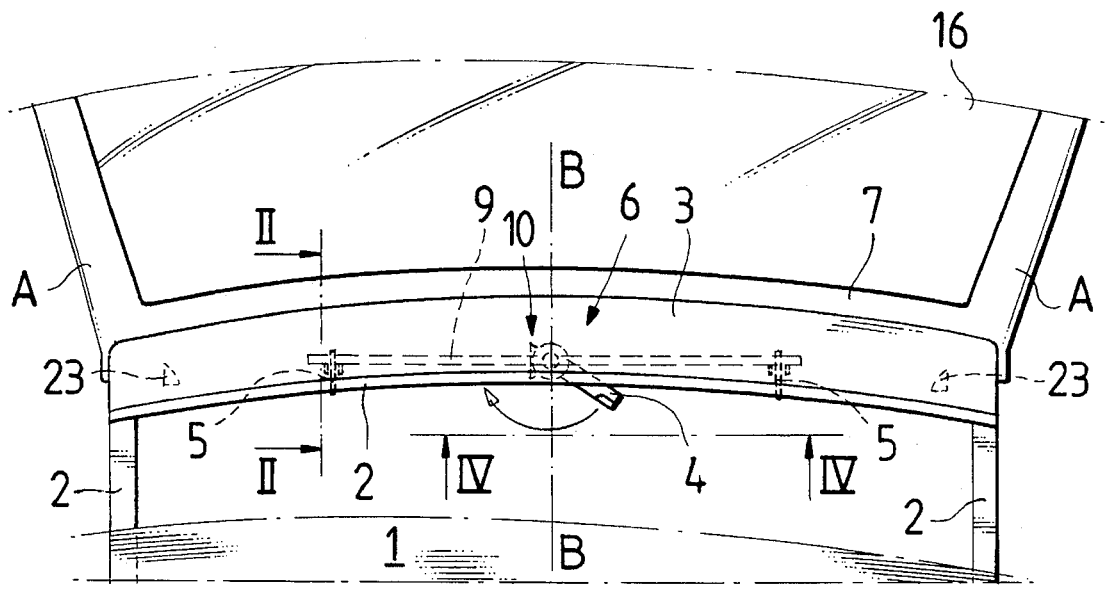
FIG. 1 presents, schematically and in top view, part of an open automobile and part of the openable top in closed position, said openable top featuring an embodiment of the locking device of the invention.

In FIG. 1 is seen, schematically and in top view, the front portion of the top framework 2 of an open automobile's openable top and its first frame rib 3. The top framework 2 is here in its closed position, in which the first frame rib 3 rests against the windshield beam 7. The windshield beam 7 is a beam extending substantially in a horizontal plane and connecting the so-called A posts A to the frame encircling the windshield 15. The locking device comprises, connected to the frame rib 3 of the top frame 2 of the openable top, a twisting handle 4, a locking hook 5, and a transmission 6 for transmitting the turning movement of the twisting handle to the locking hook 5. The locking device further comprises a fixing lug 8 (not depicted in FIG. 1) connected to the windshield beam 7 and arranged to engage the locking hook 5. The locking device comprises two locking hooks 5, spaced in relation to each other and interconnected by a transmission 6, which at the same time connects them with the joint twisting handle 4. The locking hooks 5 can simultaneously be brought into their open position, respectively into locked position, with one single turning movement of the twisting handle 4. The twisting handle 4 is placed on the centre-line of the car, indicated by a dot-and-dash line B—B, halfway between the locking hooks 5. The locking hooks 5 and the coordinated fixing lugs 8 are also symmetrically located at a distance from the centre-line and on either side thereof.

Figure 3:
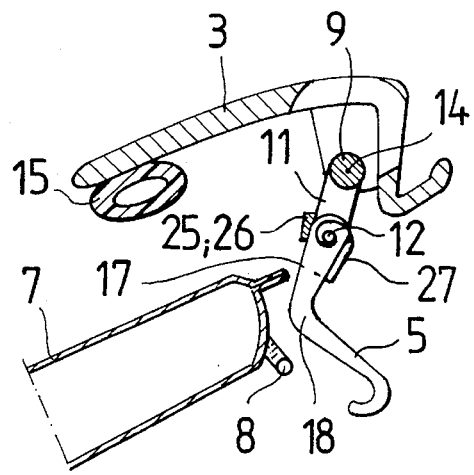
FIG. 3 shows the locking device of FIG. 2 in opened position.
Figure 4:
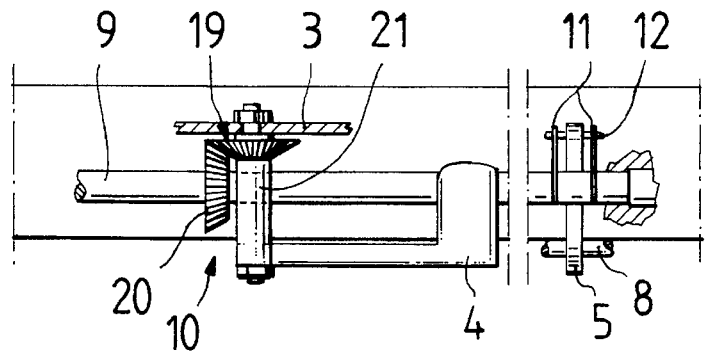
FIG. 4 shows, schematically, the section IV—IV of FIG. 1.

The transmission 6 comprises an elongated spindle 9 disposed at right angles to the centre-line B—B of the car. The spindle 9 is carried on the rib 3 of the top frame 2 so as to be rotatable about its longitudinal axis. The transmission 6 further comprises an angle drive 10 fitted between the twisting handle 4 and the spindle 9. The spindle 9 and the turning shaft of the handle are disposed at an angle of 90° to each other, and therefore an angle drive 10 is required between them which transmits the rotation of the twisting handle 4 to rotation of the spindle 9. The transmission ratio of the angle drive 10 between the shaft of the twisting handle 4 and the spindle 9 determines the amount of angular motion of the twisting handle 4 in the locking and opening movements. Advantageously, the transmission ratio of the angular drive 10 is e.g. in the range from 1:1 to 1:2, or even higher, in order that it might be possible to optimize the torque required to turn the twisting handle 4 and the space requirements of this handle to be the most favourable in view of the user's convenience and of the structures. One embodiment of the angle drive 10 is seen in FIG. 4. To the spindle 9 are attached, in register with the locking hooks 5, stationary crank levers 11, on which the locking hooks 5 are pivoted with a pivot 12. The crank levers 11 are more clearly visible in FIGS. 2, 3 and 4. In order that the locking hooks 5 might be guided accurately into register with the fixing lugs 7 and that the top in locked position might always assume one and the same position, the first rib 3 is provided, close to its ends, with conical guide pins 22, which together with depressions provided in the windshield beam 7 serve to guide the top into its proper position.

Figure 2:
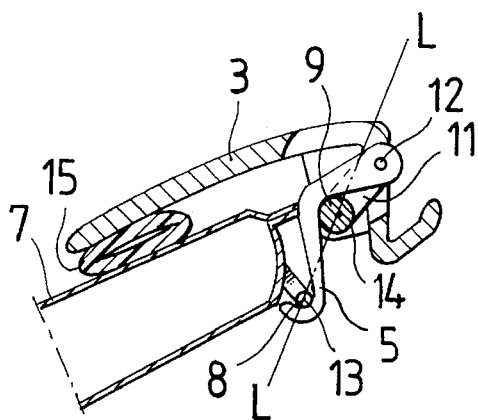
FIG. 2 shows the cross section II—II of FIG. 1, with the locking device in its locked position.

In the cross section diagram II—II of FIG. 1 in FIG. 2, the locking device is more clearly seen in locked position. FIG. 3 displays the same device in opened position.

In FIG. 2 the first frame rib 3 rests on the windshield beam 7. A resilient rubber packing 15 is attached to the frame rib 3. The locking has been arranged to be self-retaining in that, on locking, the mechanism moves over its upper dead centre, resisting any opening, and force has to be exerted to open the mechanism. Hereby the locking device cannot open inadvertently. The self-retaining feature has been accomplished in that when the locking hook 5 is in engagement with the fixing lug 8 and the crank lever turns, the centre of the pivot 12 passes over the upper dead centre on the line L—L connecting the junction point 13 of fixing lug 8 and hook 5 and the centre 14 of the spindle 9 as the spindle turns over 180°, to the end position, in which the spindle has turned through 200°. The packing 15 interposed between the rib 3 and the windshield beam 7, and possibly other spring actions inherent in the mechanism, tends to pull on the crank lever 11 and thereby pulls tight the engagement of the locking hook 5 with the fixing lug 8. On the stem 17 of the hook 5 a bight 18 has been provided so that the crank lever can move a certain distance past the upper dead centre. In the closed position the bight 18 on the stem rests against the outer surface of the spindle 9. When in the course of opening the locking device the crank lever 11 is being moved towards the upper dead centre, the packing 15, and possibly any other spring action occurring in the mechanism, will at first resist the opening with a certain force. After passing the upper dead centre this reverts to a force assisting the opening.

In FIG. 3, the locking device is depicted in opened position, and the locking hook 5 is disengaged from the fixing lug 8. In this opened condition the locking hook 5 is arranged to remain in a predetermined position relative to the crank lever 11, whereby the hook 5 can be turned along with the crank lever 11. This is indispensable in the situation when one starts to close the locking device, whereat turning the crank lever 11 clockwise toward the position of FIG. 2 the locking hook 5 is caused to turn into engagement with the fixing lug 8; and not until engagement has taken place and the locking hook 5 is in contact with the fixing lug 8 does the locking hook 5 begin to turn about the pivot 12 relative to the crank lever 11. To this end, stop members 25,26 (see FIG. 3, not depicted in FIG. 2) are provided on the crank lever 11 and on the locking hook 5 to limit the turning of the locking hook 5 relative to the crank lever 11, and a spring member 27 (see FIG. 3, not depicted in FIG. 2) or equivalent disposed to act between the locking hook 5 and the crank lever 11 in such manner that the stop member 25 of the locking hook 5 and the stop member 26 on the crank lever 11 rest against each other when the locking device is in the opened position. However, the spring member 27 and the stop members 25,26 do not impede the movement of crank lever 11 and locking hook 5 relative to each other when the locking device is brought into the locking position shown in FIG. 2. The spring force of the spring member 27 is adjusted to be comparatively minor so that it will cause little resistance to operating the locking device, yet large enough to enable it to keep the locking hook 5 in the predetermined position relative to the crank lever 11 when the locking device is in its opened state.

In FIG. 4, part of the locking device is shown as viewed in the direction IV—IV of FIG. 1, the locking device being in locked state. The angle drive 10 comprises two mitre gears in force-transmitting contact, the first gear 19 being fixed on the shaft 21 of the twisting handle 4 and the second gear 20, on the spindle 9. The twisting handle turns in a plane substantially parallelling the top, or perpendicular against the plane of the drawing. It is further seen in FIG. 4 that the crank lever 11 is here fork-like and the locking hook 5 is pivotally mounted between the legs of the crank lever 11.

The invention is not exclusively confined to concern the embodiment examples presented in the foregoing: numerous modifications are feasible without departing from the scope of the inventive idea defined by the claims.

I claim:

1. A device for locking a top of an automobile from open to closed; the top lying in a first plane substantially horizontal when the top is closed; the automobile having a body, a windshield, a top framework, and a frame rib on the top framework; the device comprising:

(a) first and second lugs fixed to the windshield;
    (b) a first locking hook connected to the frame rib at a first area for locking the top, the first locking hook having an open position for when the top is open and a closed position for when the top is closed, the first locking hook including,
        (i) a first hooking end for hooking onto said first lug when the first locking hook is in the closed position; and
        (ii) a first pivot end opposite of the first hooking end;
    (c) a first crank lever pivotably connected to said first pivot end of the first locking hook;
    (d) a second locking hook connected to the frame rib at a second area for locking the top, the second locking hook having an open position for when the top is open and a closed position for when the top is closed, the second locking hook including,
        (i) a second hooking end for hooking onto said second lug when the second locking hook is in the closed position; and
        (ii) a second pivot end opposite of the second hooking end;
    (e) a second crank lever pivotably connected to the second pivot end of the second locking hook;
    (f) a transmission connected to the frame rib and including a spindle and an angle drive having a shaft;
        (i) said angle drive connected to said spindle for rotatably driving said spindle, the angle drive rotating the spindle more than 180 degrees;
        (ii) said spindle being connected to said first and second crank levers so that when the spindle rotates, the first and second crank levers move and turn about the first and second pivot ends, respectively; and
    (g) a handle fixedly connected to said shaft of said angle drive, the handle being turnable in a second plane parallel to the first plane, the handle for transmitting force from an operator to said angle drive by turning the handle;
    wherein when the handle is turned, the transmission and first and second crank levers cooperate to move the first and second locking hooks between the open and closed positions.

2. The device of claim 1, wherein the angle drive rotates the spindle about 200 degrees.

3. The device of claim 1, wherein the angle drive has a transmission ratio between said shaft and said spindle in a range from 1:1 to 1:2.

4. The device of claim 1, further comprising:
    a first stop member attached at the first pivot end of the first locking hook;
    a second stop member attached to the first crank lever for engaging the first stop member when the first locking hook is in the open position;
    a third stop member attached at the second pivot end of the second locking hook; and
    a fourth stop member attached to the second crank lever for engaging the third stop member when the second locking hook is in the open position.

5. The device of claim 1, wherein:
    the first locking hook includes a first bight section between the first hooking end and first pivot end, the first bight section engaging said spindle when the first locking hook is in the closed position; and
    the second locking hook includes a second bight section between the second hooking end and second pivot end, the second bight section engaging said spindle when the second locking hook is in the closed position.

* * * * *